(12) United States Patent
Rhodes

(10) Patent No.: US 7,634,950 B2
(45) Date of Patent: Dec. 22, 2009

(54) METHOD OF CONSTRUCTION FOR A LOW COST PLASTIC ULTRASONIC WATER METER

(75) Inventor: Simon John Rhodes, Maidenhead (GB)

(73) Assignee: Flownetix, Limited, Berkshire (GB)

( * ) Notice: Subject to any disclaimer, the term of this patent is extended or adjusted under 35 U.S.C. 154(b) by 120 days.

(21) Appl. No.: 12/063,756

(22) PCT Filed: Jul. 28, 2006

(86) PCT No.: PCT/GB2006/002825

§ 371 (c)(1),
(2), (4) Date: Feb. 13, 2008

(87) PCT Pub. No.: WO2007/020375

PCT Pub. Date: Feb. 22, 2007

(65) Prior Publication Data

US 2009/0133506 A1    May 28, 2009

(30) Foreign Application Priority Data

Aug. 13, 2005    (GB) ................................. 0516754.9

(51) Int. Cl.
*G01F 1/66* (2006.01)
(52) U.S. Cl. .................................................. 73/861.27
(58) Field of Classification Search . 73/861.25–861.29, 73/861.04, 273
See application file for complete search history.

(56) References Cited

U.S. PATENT DOCUMENTS

| 3,580,092 | A |   | 5/1971 | Scarpa |
| 4,553,433 | A | * | 11/1985 | Hicks ........................... 73/273 |
| 4,860,591 | A | * | 8/1989 | Garland ................... 73/861.04 |
| 5,295,120 | A |   | 3/1994 | McShane |
| 5,614,672 | A | * | 3/1997 | Legendre et al. .............. 73/437 |
| 6,874,371 | B1 |  | 4/2005 | Smith et al. |
| 2004/0261523 | A1 | * | 12/2004 | Cognot ......................... 73/273 |

FOREIGN PATENT DOCUMENTS

| DE | 29621964 U1 | 4/1997 |
| EP | 1482284 A1 | 12/2004 |
| GB | 2248502 A | 4/1992 |
| WO | WO 2005/043092 A1 | 5/2005 |

* cited by examiner

*Primary Examiner*—Jewel Thompson
(74) *Attorney, Agent, or Firm*—Leydig, Voit & Mayer, Ltd.

(57) ABSTRACT

There is described an ultrasonic flow meter comprising a pipe having two ends, electronic circuitry, a first enclosure housing the electronic circuitry, a second enclosure housing the pipe, and a plurality of ultrasonic transducers attached to an external surface of the pipe in the second enclosure. The first enclosure is watertight, whereas the second enclosure is not watertight. The two ends of the pipe protrude from the second enclosure. Each transducer is covered by a respective cap and sealed from water ingress. Each transducer is connected to the electronic circuitry by a respective pair of wires.

7 Claims, 5 Drawing Sheets

METHOD OF CONSTRUCTION FOR A LOW COST PLASTIC ULTRASONIC WATER METER

CROSS REFERENCE TO RELATED APPLICATIONS

This application is a National Phase of International Application Serial No. PCT/GB2006/002825 which was filed on Jul. 28, 2006 which claims priority to Great Britain Patent Application Serial No. 0516754.9 filed on Aug. 13, 2005.

FIELD OF THE INVENTION

This invention relates to the creation of a flow measurement cell and enclosure for an all-electronic water meter.

BACKGROUND OF THE INVENTION

Traditional ultrasonic flow meters are industrial instruments and are enclosed in rugged, usually metal, pipe shaped transducer enclosures with integral or separately mounted electronics.

The object of this invention is to package an ultrasonic flow meter using plastics suitable for high volume manufacture while giving the outward appearance similar to a traditional mechanical water meter.

SUMMARY OF THE INVENTION

Accordingly this invention houses the section through which the water flows, with a separate sealed section for the electronic parts; the sealing allows operation when submerged in water.

The water meter is typically made of engineering plastics most suitable for the application. Typically this will consist of a flow tube that carries the water flow being measured, this being constructed of a strong, moldable thermoplastic approved for use with potable water and an outer case comprising several sections to house the flow tube, electronics and a lid to protect the display. All materials used are suitable for use to the maximum operating temperature.

In summary, according to the present invention, there is provided an ultrasonic flow meter comprising a pipe having two ends; electronic circuitry; a first enclosure housing the electronic circuitry, the first enclosure being watertight; a second enclosure housing the pipe, the two ends of the pipe protruding from the second enclosure, the second enclosure not being watertight; and a plurality of ultrasonic transducers attached to an external surface of the pipe in the second enclosure, each transducer being covered by a respective cap and sealed from water ingress, each transducer being connected to the electronic circuitry by a respective pair of wires.

BRIEF DESCRIPTION OF THE DRAWINGS

A typical embodiment of the invention will now be described with reference to the accompanying drawings in which.

DETAILED DESCRIPTION OF A PREFERRED EMBODIMENT

Figure 1:
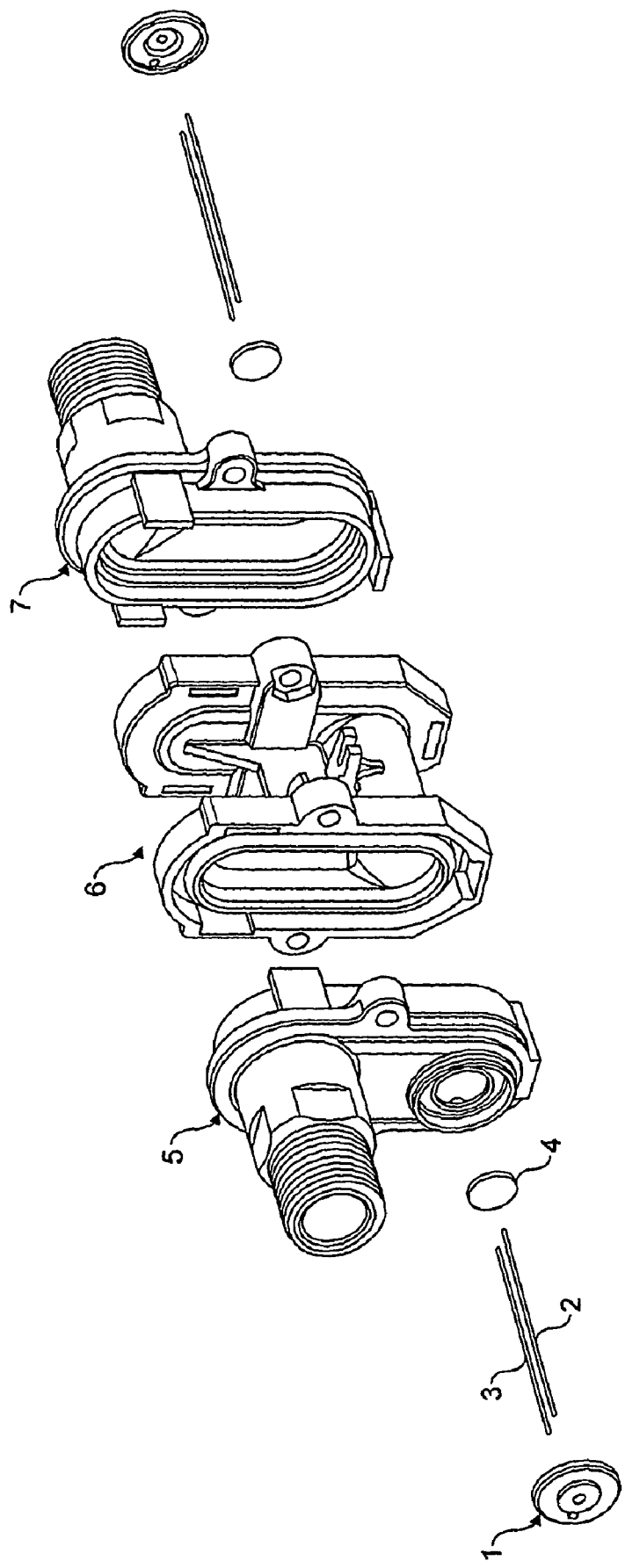
FIG. 1 shows a U-tube implementation of a flow measurement cell, typically used for pipes up to 25 mm bore size.

As showing in FIG. 1, the U-tube is constructed from three main parts, two ends 5 and 7 and a centre body part 6. This is needed so as to make the part moldable using injection moulding techniques.

The exposed pipe section of the end 5 is threaded to accept standard fittings and also includes a flatted area for use with spanners during fitting to reduce stress on the tube/enclosure assembly as the fitting is tightened.

The two ends 5 are ultrasonically welded to the centre body section 6 and can typically withstand pressures to 50 bar. The two transducers 4 with wires 2 and 3 already attached are fixed into two locating rings on the ends of the tube 5 using an epoxy resin. The wires are then passed through a cap 1 that is placed over the transducers and then sealed with a sealant. The transducers are now sealed from water ingress. This is important as the case design allows water to ingress into the bottom part of the enclosure while allowing the equipment to continue to operate due to the sealed transducers and electronics.

The transducer 4 is the same diameter as the inside bore of the pipe so the ultrasonic signal passes through the whole area of flowing liquid.

Figure 2A:
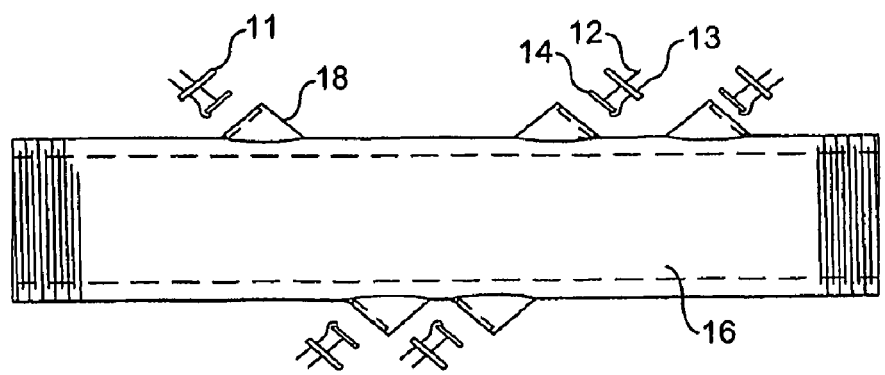
FIG. 2 shows a straight tube, angled transducer implementation of a flow measurement cell, typically used on pipes over 25 mm bore size.
Figure 2B:
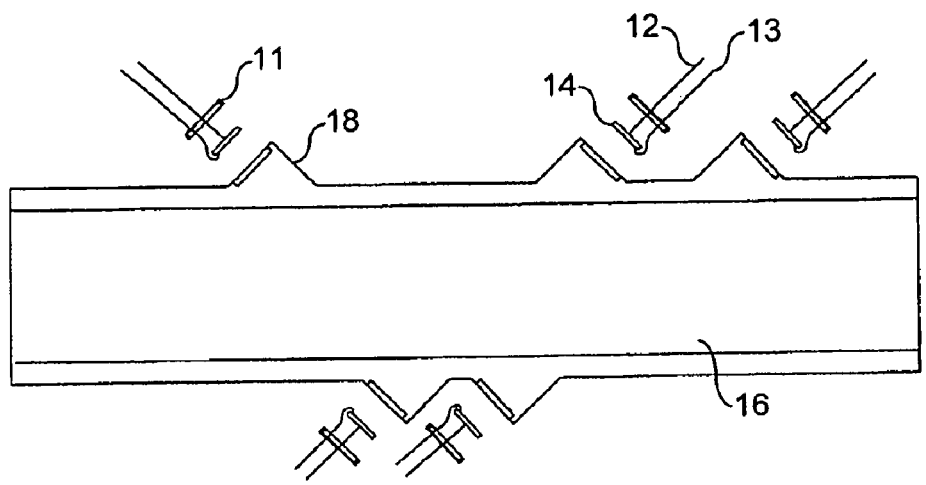
Figure 2C:
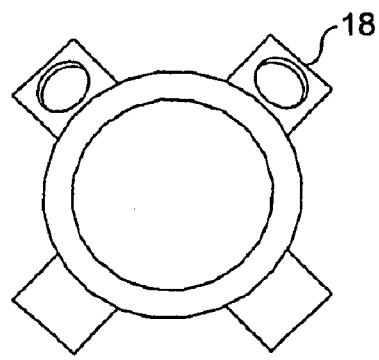

FIG. 2 shows the same process for a straight through flow tube. The tube is made in a single piece body 16 with the wedges 18 being at an angle determined by the pipe diameter and flow range required. Multiple transducer pairs 14 are used on the straight design to measure across a wider area or extend the operating flow range in either a reflection (vee) or diagonal (zee) configuration. Again, caps 11 are placed over the transducers 14 and sealed to protect the transducers from water ingress.

Figure 3:
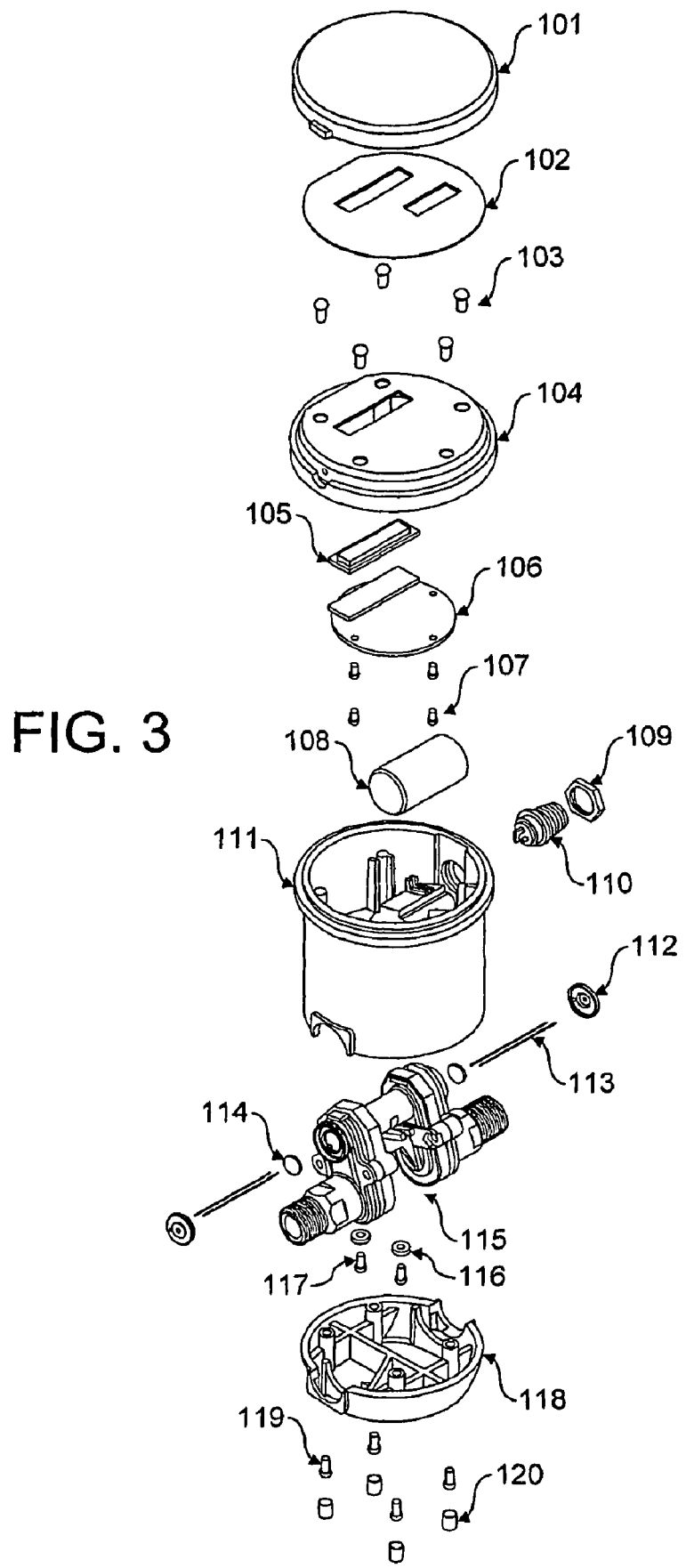
FIG. 3 shows how the internal parts (tube and electronics) fit together with the outer enclosure.

As shown in FIG. 3, the electronic parts fit into the top half of the enclosure body 111. The top cover 104 holds the LCD viewing window 105 (ultrasonically welded in place to ensure sealing), circuit board 106 secured by screws 107. The battery 108 is supported in the main body 111. A waterproof connector 109 interfaces to external equipment. Such connectors usually have a nut that is tightened from the outside so to prevent tampering a protective cover is ultrasonically welded over the top. The assembled to cover 104, 105, 106 and 107 is screwed 103 to the main body 111 with an o-ring seal between. Tamper proofing is achieved by potting the screw holes in the top cover 104 and covering with a label 102 with serial number and other information required by regulatory agencies. A flip over lid 101 clips shut over the assembly to protect the display from direct impacts.

The assembled tube (FIG. 3 shows the u-tube arrangement 112, 113, 114 and 115, similar for straight tube) fits into the part of the main body 111 and is secured using a screw 117 and support 116. Additional support is provided by detail inside the body to support the tube and prevent rotation.

The wires 113 are passed through the already fitted cap 112, through holes in the wall half way up the main body 111 to be connected to the electronics assembly in the top half. Sealant is used around the wires where they pass through the divider in the main body 111 to prevent any water ingress in the bottom part of the enclosure reaching the top part.

The bottom of the body 111 is covered using a base part 118 which is attached using screws 119. The screw holes are filled with an epoxy resin and plastic plugs 120 pushed into the holes which are then sealed. Any tampering is therefore destructive to the case and clearly evident.

Figure 4A:
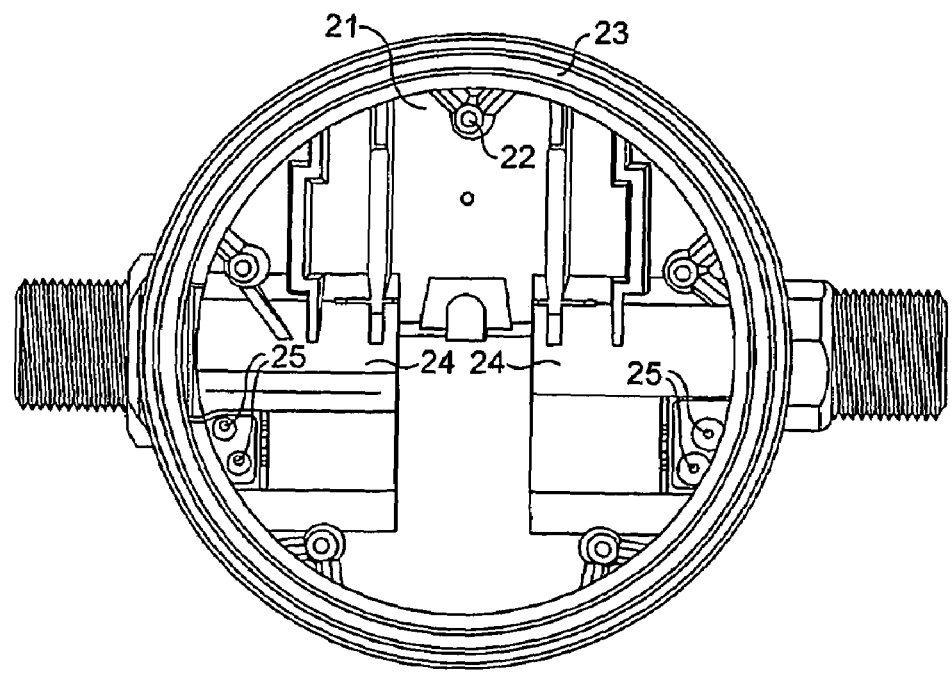
FIG. 4 shows the detail inside the body that supports the tube and prevents it rotating and sealed from the electronics.
Figure 4B:
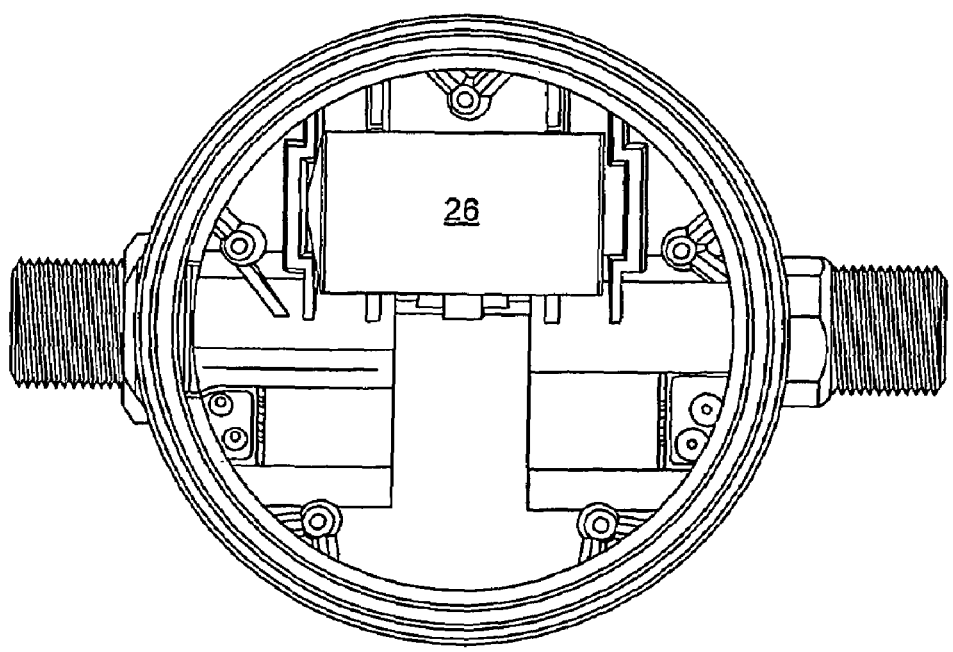

FIG. 4 shows the inside main body from above including battery support 21, battery location 26, holes for wires from the transducer assembly in the lower half to pass through 25 and support structures for the u-tube 24. Also shown are mounting points for the top part of the case 25 and the o-ring seal 23 that ensures the electronics is sealed from water ingress.

Figure 5A:
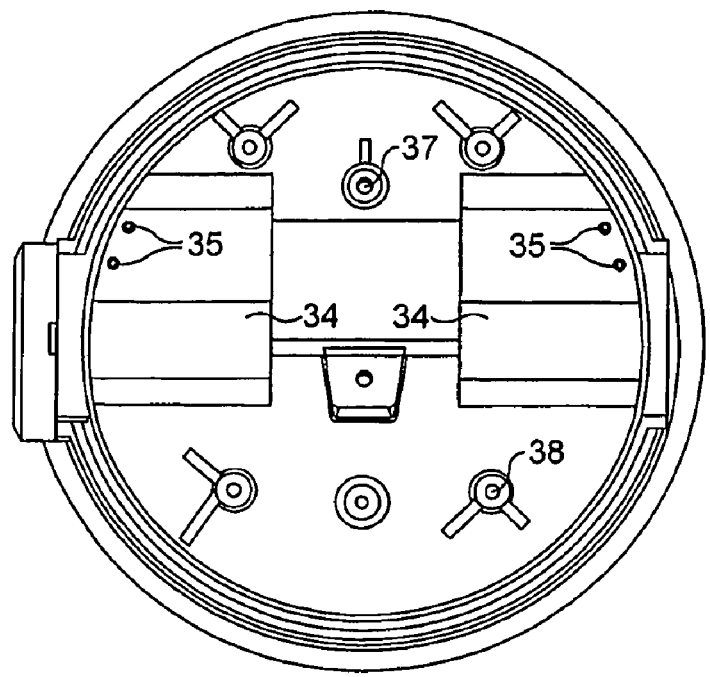
FIG. 5 shows the inside of the main body from below.
Figure 5B:
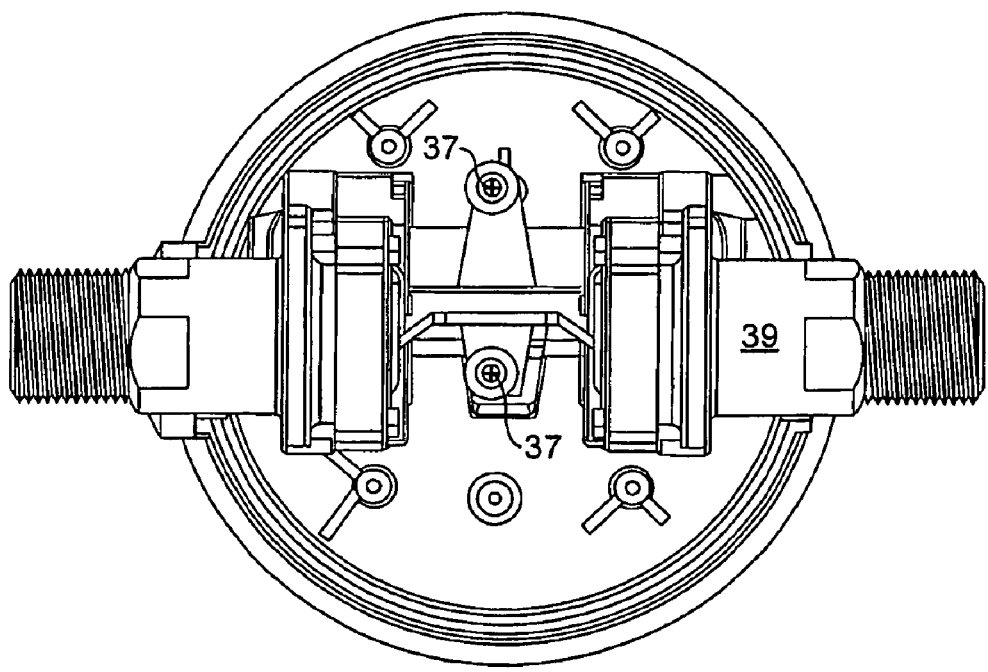

FIG. 5 shows the inside of the main body from below including supports for the u-tube 34, holes for the transducers to pass through 35, mounting points for the bottom of the case 38 and securing points for the tube 37. FIG. 2 shows the tube in position 39 with screws in the supports 38. This prevents the meter from damage by securing the tube inside the case.

I claim:

1. An ultrasonic flow meter comprising:
   a pipe having two ends;
   electronic circuitry;
   a first enclosure housing the electronic circuitry, the first enclosure being watertight;
   a second enclosure housing the pipe, the two ends of the pipe protruding from the second enclosure, the second enclosure not being watertight; and
   a plurality of ultrasonic transducers attached to an external surface of the pipe in the second enclosure, each transducer being covered by a respective cap and sealed from water ingress, each transducer being connected to the electronic circuitry by a respective pair of wires.

2. The ultrasonic flow meter of claim 1 in which:
   the pipe comprises a U-tube, the U-tube comprising two parallel side tubes joined together by a central tube; and
   the ultrasonic flow meter comprises two ultrasonic transducers, each transducer being attached to a respective end of the central tube.

3. The ultrasonic flow meter of claim 2 in which a diameter of each of the transducers is equal to an internal diameter of the central tube.

4. The ultrasonic flow meter of claim 1 in which the pipe is a straight pipe comprising a plurality of wedges for mounting the transducers at an angle to a surface of the pipe.

5. The ultrasonic flow meter of claim 1 in which the first enclosure comprises a waterproof connector for interfacing to external equipment.

6. The ultrasonic flow meter of claim 1 in which the first enclosure comprises an LCD display.

7. The ultrasonic flow meter of claim 1 in which the pipe is formed from a thermoplastic.

* * * * *